United States Patent
Nakazato et al.

[11] Patent Number: 5,771,340
[45] Date of Patent: Jun. 23, 1998

[54] DATA COMPRESSION METHOD AND PRINT PROCESSING DEVICE UTILIZING THE SAME

[75] Inventors: Hirohiko Nakazato; Hideo Sutoh, both of Tokyo, Japan

[73] Assignee: Oki Electric Industry Co., Ltd., Tokyo, Japan

[21] Appl. No.: 770,472

[22] Filed: Dec. 18, 1996

Related U.S. Application Data

[63] Continuation of Ser. No. 371,681, Jan. 12, 1995, abandoned.

[30] Foreign Application Priority Data

Jan. 14, 1994 [JP] Japan .................................... 6-002370

[51] Int. Cl.[6] .................................................. G06K 15/00
[52] U.S. Cl. ........................................ 395/114; 395/112
[58] Field of Search ..................................... 395/114, 112, 395/115, 116, 439, 442; 358/426, 261.1, 261.2, 261.3, 427, 430, 431, 432, 433, 404, 444; 382/239; 341/51, 95, 107, 63; 711/112, 115

[56] References Cited

U.S. PATENT DOCUMENTS

| | | | |
|---|---|---|---|
| 4,862,167 | 8/1989 | Copeland, III | 341/107 |
| 4,872,009 | 10/1989 | Tsukiyama et al. | 341/95 |
| 5,045,852 | 9/1991 | Mitchell et al. | 341/51 |
| 5,150,454 | 9/1992 | Wood et al. | 395/114 |
| 5,249,053 | 9/1993 | Jain | 358/209 |
| 5,276,898 | 1/1994 | Kiel et al. | 395/800 |
| 5,325,423 | 6/1994 | Lewis | 379/90 |
| 5,374,916 | 12/1994 | Chu | 340/146.2 |
| 5,376,968 | 12/1994 | Wu et al. | 348/413 |
| 5,379,757 | 1/1995 | Hiyama et al. | 128/6 |
| 5,394,534 | 2/1995 | Kulakowski et al. | 395/425 |
| 5,414,795 | 5/1995 | Tsutsui et al. | 395/2.13 |
| 5,479,587 | 12/1995 | Campbell et al. | 395/114 |
| 5,535,311 | 7/1996 | Zimmerman | 395/114 |

*Primary Examiner*—Edward L. Coles
*Assistant Examiner*—Dov Popovici
*Attorney, Agent, or Firm*—Rabin, Champagne, & Lynt, P.C.

[57] ABSTRACT

A printing data transmitted from a host computer is stored in a receiving buffer. An editorial unit receives the printing data in the receiving buffer in each one line and writes into a page buffer after compressed. An expansion unit reads out the printing data in the page buffer and deploys them into a band buffer as a raster data. An engine unit performs printing in accordance with the raster data in the band buffer. The editorial unit compresses the printing data of each line up until the preset line N with plural types of compression techniques and computes compression rates for each line. A compression technique to be applied is determined in accordance with the compression rates. The printing data of each line up until those of the preset line X are compressed by the determined compression technique. A determination of the compression technique is repeated in every completion of the printing data processing for the X lines.

32 Claims, 6 Drawing Sheets

| | COMPRESSION RATE IN ACCORDANCE WITH THE FIRST COMPRESSION TECHNIQUE [%] | COMPRESSION RATE IN ACCORDANCE WITH THE SECOND COMPRESSION TECHNIQUE [%] |
|---|---|---|
| LINE 1 | Ca1 | Cb1 |
| LINE 2 | Ca2 | Cb2 |
| LINE 3 | Ca3 | Cb3 |
| LINE 4 | Ca4 | Cb4 |
| LINE N | CaN | CbN |

DATA COMPRESSION METHOD AND PRINT PROCESSING DEVICE UTILIZING THE SAME

This application is a continuation of application Ser. No. 08/371,681, filed Jan. 12, 1995, now abandoned.

REFERENCE TO RELATED APPLICATION

This application claims the priority right under 35 U.S.C. 119, of Japanese Patent Application No. Hei 06-002370 filed on Jan. 14, 1994, the entire disclosure of which is incorporated herein by reference.

BACKGROUND OF THE INVENTION

1. Field of the Invention

The present invention relates to a data compression method, and more particularly to a data compression method effectively applied to a print processing device such as a page printer or the like in which the optimum compression technique is chosen and employed from among plural available types of compression techniques in accordance with the particular data being printed.

2. Description of the Related Art

A recent functional development of for computers is the capability of editing image data or the like which requires a larger amount of data than does character data such as a letter. Printing out such image data requires a huge amount of printing data to be sent to the printer as compared to that required for printing character data.

Accordingly, in a page printer in which information pertaining to one printed page is edited in a form such that it is laid out and printed per individual page, the amount of data sent to the printer can be substantially reduced by compressing the received printing data, and raster graphic data, and writing it in a page buffer memory so as to make more efficient of a memory. In other words, since the most optimum compression technique for each page printer differs depending on its received data, the printing data of each line is compressed by plural types of compression techniques installed in each page printer. Then, each compression ratio (printing data capacity after compression/original printing data capacity) is compared in each line and one of the compression techniques, the compression ratio and the data capacity of which are smallest, is selected.

However, a conventional page printer compresses the printing data of each line with plural types of compression techniques, calculates or computes each compression ratio, employs the optimum compression technique, and writes the compressed printing data of each line into the page buffer memory every time. There has been a problem in such above the method that the time necessary for compression will be long although data compression efficiency increases, so that a lead time for initiating the printing will become long.

Accordingly, the conventional page printer has raised a problem that the data compression processing causes a delay of the printing speed of the printer as a whole.

SUMMARY OF THE INVENTION

It is, therefore, an object of the present invention to provide a page printer and a data compression method applied to the page printer which can solve the above problems and shorten the lead time for initiating the printing.

To accomplish the above object, there is provided a data compression method incorporating plural types of compression techniques therein for compressing data by selecting an optimum compression technique from among the plural types of compression techniques, the method including the steps of: (a) compressing data having a first data amount consecutively by each of the plural types of compression techniques to compute each compression ratio, (b) selecting an optimum data compression technique from among the plural types of compression techniques in accordance with each computed compression ratio; and (c) compressing data by employing the selected compression technique.

According to another aspect of the present invention, there is provided a data compression method including the steps of: (a) compressing the printing data of each line up to a first preset line using plural types of compression techniques; (b) computing compression rates for each line; (c) determining an optimum compression technique from among the plural types of compression techniques; (d) compressing the printing data of each line up to a second preset line beyond the first present line using the optimum compression technique; and (e) repeating step (c) for every line.

According to a further aspect of the present invention, there is provided a printer driver for accepting a printing data including control data from an application program and processing the printing data in a format that enables it to be printed using a printing device to which the printing data is provided, the printer driver including: (a) means for receiving the printing data, including the control data, from the application program; (b) means for compressing the printing data of each line up to a first preset first line using plural types of compression techniques and computing compression ratios for each line; (c) means for determining a most optimum compression technique from among the plural types of compression techniques in accordance with the compression ratios and compressing the printing data of each line up until a second preset line beyond the first preset line with the optimum compression technique; and (d) means for repeating a determination of the optimum compression technique for every line.

According to a still further aspect of the present invention, there is provided a printing processing device including: (a) a receiving buffer for storing printing data; (b) an editorial unit for receiving the printing data in the receiving buffer for each individual line and for writing the printing data after compression into a page buffer; (c) an expansion unit for reading the printing data in the page buffer in order to expand the printing data as raster data into a band buffer; and (d) an engine unit for printing in accordance with the raster data in the band buffer; the editorial unit compressing the printing data of each line up until a first preset line using plural types of compression techniques and computing compression ratios for each line;

the editorial unit determining a compression technique in accordance with the compression ratios and compressing the printing data of each line up until a second preset line with the plural types of compression techniques so as to repeat a determination of a compression technique in every completion of printing data processing for up to the second preset line.

A page printer according to the present invention incorporates therein a receiving buffer and, an editor receives the printing data in the receiving buffer for each individual line and writes it into a page buffer after compression.

Then, an expansion unit reads out the printing data in the page buffer and expands the printing data, as raster data, into a band buffer. Consequently, an engine unit performs printing in accordance with the raster data in the band buffer.

Also, the editor proceeds to compress the printing data of each line up until the the Nth preset line set, in advance, with a predetermined number N with plural types of compression techniques and to compute the compression ratios in each line.

Then, the optimum compression technique is determined in accordance with the above compression ratios and the printing data in each line is compressed up until the preset line X (X is a predetermined number larger than N).

Determination of the optimum compression technique will be repeated in each completion of the processing of the printing data for X lines. A data compression method according to the present invention is performed in such a manner that the printing data of each line up to the predetermined line N is compressed at the beginning by plural types of compression techniques.

Then, the compression ratios of each line are computed and the optimum compression technique is determined in accordance with those compression ratios. Subsequently, the printing data of each line up to the predetermined line X is compressed by the determined compression technique. Determination of the optimum compression technique will be repeated in each completion of the processing of the printing data for X lines.

Accordingly, the compression technique having a smaller compression ratio will be selected in each completion of the processing of the printing data for X lines.

DETAILED DESCRIPTION OF THE PREFERRED EMBODIMENTS

Now, a detailed description will be made as to a data compression method according to the present invention and a print processing device to which the data compression method is applied in reference to the attached drawings.

Figure 1:
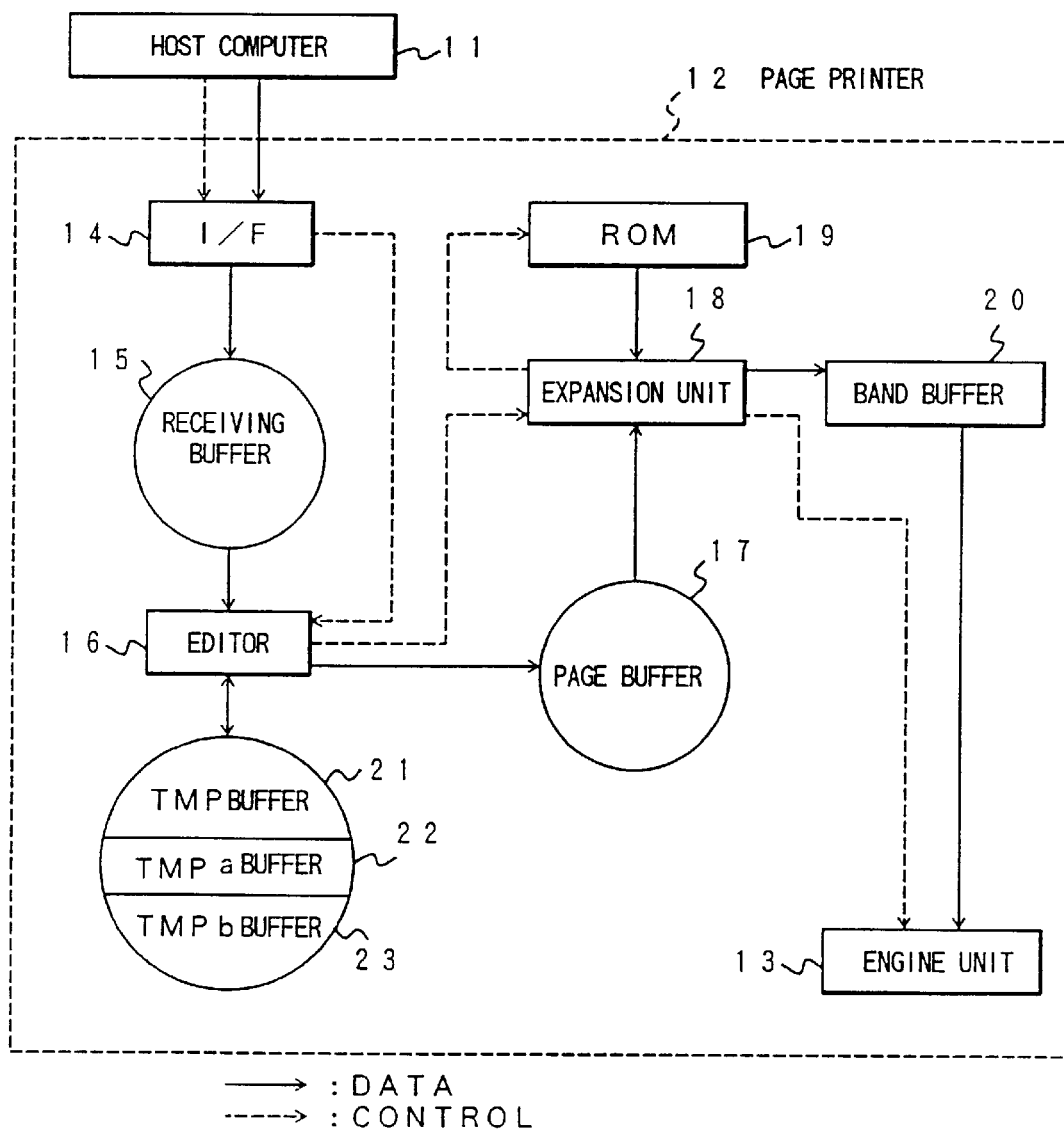
FIG. 1 is a functional block diagram illustrating a data compression method according to the preferred embodiment of the present invention applied to a page printer.

FIG. 1 is a block diagram illustrating a print processing device, in particular, a page printer to which a data compression method according to the present invention is applied, in which a host computer 11, which comprises a personal computer, a work station, an office computer or the like, transfers printing data to a page printer 12. The page printer 12, which comprises an interface (I/F) 14, a receiving buffer 15, an editor 16, a page buffer 17, an expansion unit 18, a read only memory (ROM) 19, a band buffer 20, a TMP buffer 21, a TMPa buffer 22, a TMPb buffer 23 and an engine unit 13, has a compression/expansion function editing one page information which is laid out for printing each page unit. Arrows shown as a solid line in FIG. 1 illustrate a flow of printing data, whereas arrows shown as a dashed line illustrate a flow of control data.

The interface 14 connects a host, which is connected to the host computer 11, with a printer. The receiving buffer 15 temporarily stores the printing data, including control data, received from the host computer 11. The editor 16 reads the printing data in the receiving buffer 15 and edits it to form printing data for one page. The page buffer 17 is comprises memory which specifies a character to the printing data sent, for example, from the editor 16 in reference to character codes already set, determines a kind and a size for the character, determines a position where the character is printed and memorizes the information for one page.

The expansion unit 18 reads out the printing data in the page buffer 17, reads out real image data as a character cell (memory region for one character) from the ROM 19 serving as a character generator, deploys the image data into the raster data, writes it into the band buffer 20 and constitutes one page image which is actually printed. The TMP buffer 21 temporarily stores one line printing data, the TMPa buffer 22 stores a compressed result of the printing data compressed by the first compression technique, and the TMPb stores a compressed result compressed by the second compression technique.

Although the present embodiment shows a case in which two, the first and second, compression techniques have been utilized, the number of compression techniques is not restricted to two so that more three or more compression techniques can also be utilized. Further, a page printer employs various kinds of compression techniques, for example, "TIFF" (Tagged Image File Format), "Delta Row" (Delta Row Compression), "Run Length Codification Method", and the like. "TIFF" is effectively utilized for printing data which includes repetition of the same code and "Delta Row" is effectively utilized for printing data which has little difference from the precedent row. "Run Length Codification Method", which has been utilized for a facsimile or the like as a band compression technique, is effectively utilized for printing data having a lot of white regions (unprinted regions).

Figure 2:
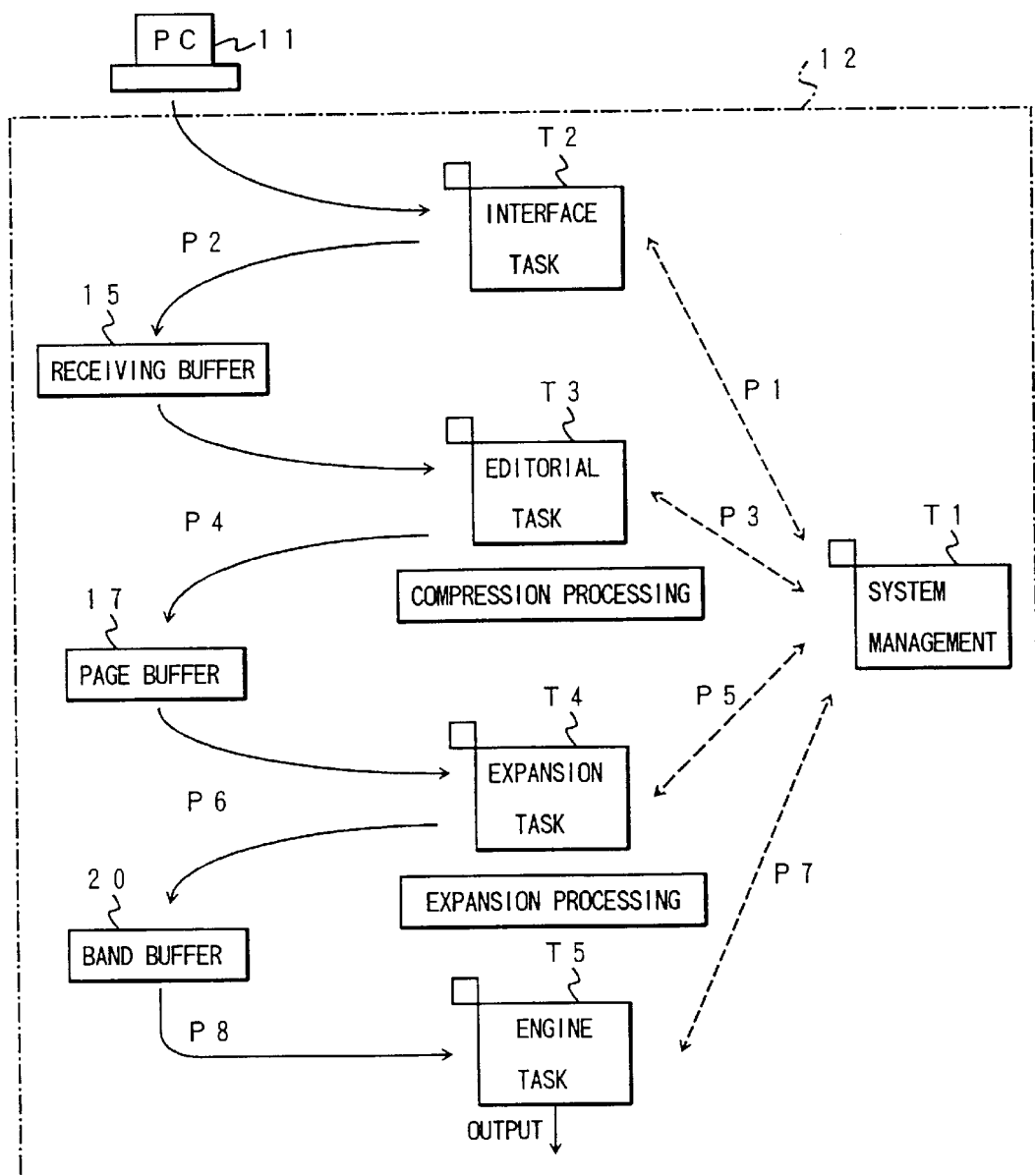
FIG. 2 is an explanatory view illustrating a processing method for the printing data of the page printer shown in FIG. 1.

FIG. 2 shows a conceptual view illustrating a processing method for the printing data in the page printer 12 shown in FIG. 1.

Detailed description will be made hereinafter as to the page printer 12 in reference to these drawings.

When the host computer (PC) 11 transmits the printing data to the page printer 12, the control is transferred from a system management T1 to an interface task T2 (IFC: Interface Controller) of the interface 14 at a step P1 and the printing data is written in the receiving buffer 15 in the interface task T2 at a step P2.

Then, the control is transferred through the system management T1 to an editorial task T3 at a step P3 and the printing data in the receiving buffer 15 is edited to be written in the page buffer 17 at a step P4. In this instance, the printing data, one page data amount of which exceeds a predetermined amount, is processed to be compressed (compression process) so that a memory size necessary for the page buffer 17 can be reduced, which increases an efficiency for using a memory.

When the printing data having one page data amount is written in the page buffer 17, the control is transferred, through the system management T1, to an expansion task T4 at a step P5. The printing data in the page buffer 17 is read out and deployed into the raster data in the expansion task T4 in order to be written in the band buffer 20 at a step P6. In this instance, the printing data in the page buffer 17 is expanded (expansion process), if it was previously compressed.

When the printing data is written in the band buffer 20, the control is transferred, through the system management T1, to an engine task T5 at a step P7 and actual printing on paper is initiated at a step P8.

Now, description will be made as to the processing of the editorial task T3.

The editorial task T3 first judges whether or not a compression technique has been determined. If it has not been determined, the editorial task T3 compresses the printing data of each line up until a predetermined line N with plural kinds of compression techniques, computes compression ratios Ca and Cb for each line, and determines the desired compression technique by comparing the compression ratio Ca with the ratio Cb.

If a compression technique has been already determined, the editorial task T3 compresses the printing data of each line to the line X (X>N) with the already determined compression technique. And then, when processing for the printing data up to the line X is complete, a determining process for determining a new compression technique will be repeated for the following lines.

As described above, a certain compression technique to be applied up until the line X is determined depending upon the compression ratio for the preset N lines. A specific number for N or X is one of the elements for determining a compression ratio or a compression processing time of the printing data. In other words, the larger the number N is, the longer the compression processing time is, although the compression ratio of the printing data can be expected to be reduced. On the other hand, if the number X increases, the compression rate of the printing data increases so that the compression efficiency will be reduced although the compression processing time is shortened. As a result of a simulation which was held taking the above described facts into consideration, N=32 and X=96 have been obtained as one example of the optimum numbers for N and X.

Figures 5, 6:
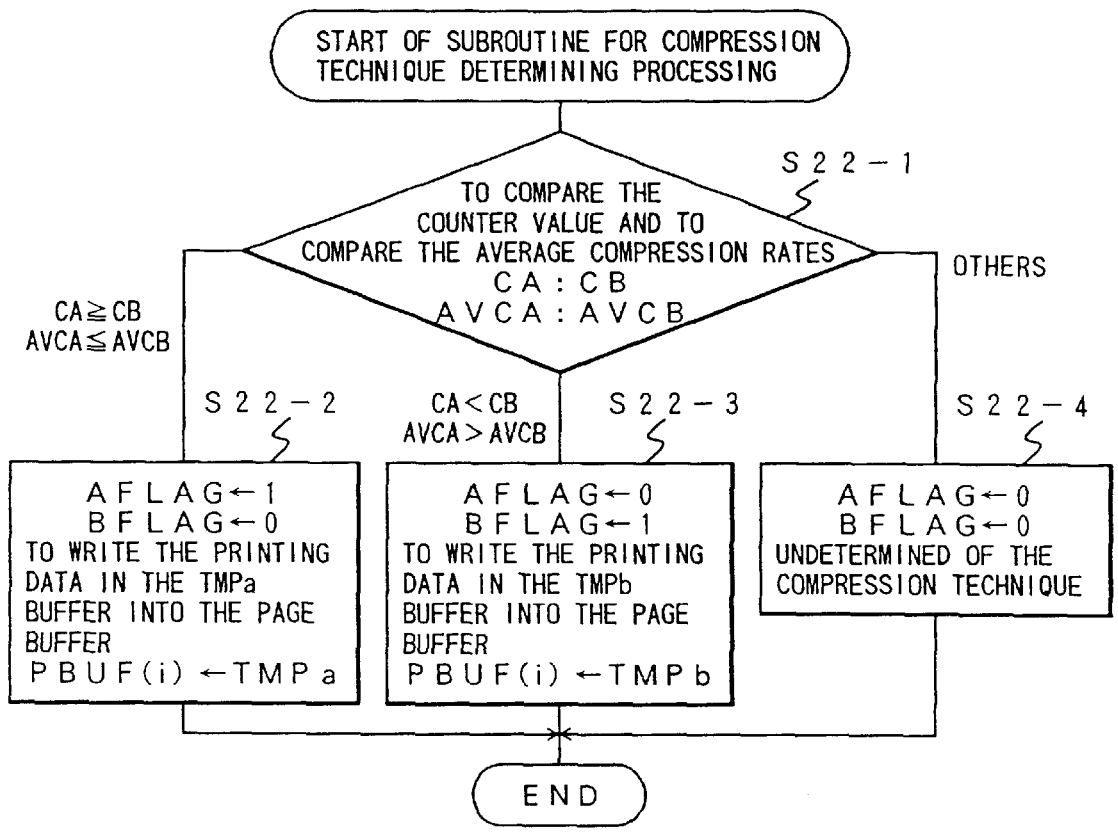
FIG. 5 is a flowchart illustrating a subroutine which determines the optimum compression technique in the data compression method shown in FIG. 3.
FIG. 6 is a table structure view illustrating a compression table according to the preferred embodiment of the present invention.

In the case where the compression technique has not been determined, when the printing data is received in the receiving buffer 15, the editor 16 reads out the printing data of a head line 1 into the TMP buffer 21 and compresses it with a compression technique installed therein. In the case, for example, where the page printer 12 installs therein two kinds of compression techniques, a first and a second the printing data of the head line 1 is compressed at first, by the first compression technique, the compressed printing data is written into the TMPa buffer 22, and the compression ratio Ca1 under the first compression technique is stored, as shown in FIG. 6, into a compression table in the editor 16. The printing data of the head line 1 is then compressed by the second compression technique, the compressed printing data is written into the TMPb buffer 23, and the compression ratio Cb1 under the second compression technique is stored, as shown in FIG. 6, into the compression table in the editor 16. On the other hand, unillustrated counters C1 and C2 are respectively assigned to the first and second compression techniques. When each of the compression ratios Ca1 and Cb1 for the head line 1 is computed, a comparison is made between the compression ratio Ca1 and the compression ratio Cb1. Then, the counted number of either counter C1 or the counter C2 whichever is assigned to the better compression technique (having a smaller compression ratio in this case) is incremented. Accordingly, in the processing of the printing data up until the line N, the counted number CA of the counter C1 indicates a number of lines to which the compression ratios Ca1~CaN in accordance with the first compression technique are smaller than the compression ratios Cb1~CbN in accordance with the second compression technique, whereas the counted number CB of the counter C2 indicates a number of lines to which the compression ratios Cb1~CbN in accordance with the second compression technique are smaller than the compression ratios Ca1~CaN in accordance with the first compression technique.

While the above described processing is repeated N times, the compression ratios Ca1~CaN and Cb1~CbN of each line are added for each compression technique and average mean values AVCA and AVCB of the compression ratios Ca1~CaN and Cb1~CbN (hereinafter referred to as "average compression ratio") are calculated.

A compression technique to be applied to the subsequent lines is determined by utilizing the counted numbers CA and CB and the average compression ratios AVCA and AVCB in a manner described below.

First, comparisons are made between the counted numbers CA and CB and between the average compression ratios AVCA and AVCB.

If the following formulas are satisfied, the first compression technique is employed.

$CA \geq CB$, and $AVCA \leq AVCB$

In other words, if the first compression technique is superior to the second compression technique in the printing data processing processing for N lines with regard to counted numbers CA and CB and average compression ratios AVCA and AVCB, the first compression technique is employed.

On the contrary, if the following formulas are satisfied, the second compression technique is employed.

$CA < CB$, and $AVCA > AVCB$

In other words, if the second compression technique is superior to the first comparison technique in the printing data processing performed for N lines with regard of counted numbers CA and CB and average compression ratios AVCA and AVCB, the second compression technique is employed.

Then, if the first compression technique is employed, the printing data in the TMPa buffer 22 is written into the page buffer 17, whereas, if the second compression technique is employed, the printing data in the TMPb buffer 23 is written into the page buffer 17.

If the result of the comparisons between the counted numbers CA and CB and between the average compression ratios AVCA and AVCB does not satisfy both the above described conditions, no compression techniques are determined so that compression of the printing data for further N lines is performed to compare each of the compression ratios. A determination as to the compression technique can be made by taking further conditions into consideration. For example, the case where the counted numbers CA and CB differ in a large degree with each other, for example CA>>CB, and the average compression ratios AVCA and AVCB differ in a small degree with each other indicates that the first compression technique is slightly superior to the second compression technique in almost every line of the N lines but the second compression technique is extremely superior to the first compression technique in a few lines.

In the above case, when the lines to which the second compression technique is extremely superior to the first compression technique are concentrated in the former half of the lines stored in the compression table, the first compression technique is employed in the subsequent processing, whereas when the lines to which the second compression technique is extremely superior to the first compression technique are concentrated in the latter half of the lines stored in the compression table, the second compression technique is employed in the subsequent processing.

Concretely in the case N=32, the former half lines consist of lines 1 to 16 and the latter half lines consist of lines 17 to 32. Assuming X=96, when the lines to which the second compression technique is extremely superior to the first compression technique are concentrated in the former half of the lines stored in the compression table, the second compression technique is applied to the lines 1 to 16 and the first compression technique is applied to the lines 17 to 96. On the other hand, when the lines to which the second compression technique is extremely superior to the first compression technique are concentrated in the latter half of the lines stored in the compression table, the first compression technique is applied to the lines 1 to 16 and the second compression technique is applied to the lines 17 to 96. If the line N reaches to the end of the page, data of the compression table is discarded and further processing will be initiated from a head line of the next page. If the difference is large between the average compression ratios AVCA and AVCB, the number X of lines to which the same compression technique is applied can be set larger in the subsequent steps. Further, the number N of lines with which the average compression ratios AVCA and AVCB are computed can be reduced. If a compression technique is determined in such a manner described above, the printing data is compressed by the same compression technique being applied up to the line X.

When the processing step reaches to the end of a page prior to its completion for the X lines, the compression processing is stopped there and the processing step starts from the head line of the next page up until the line N so as to compare each compression ratios Ca and Cb with each other.

Figure 3:
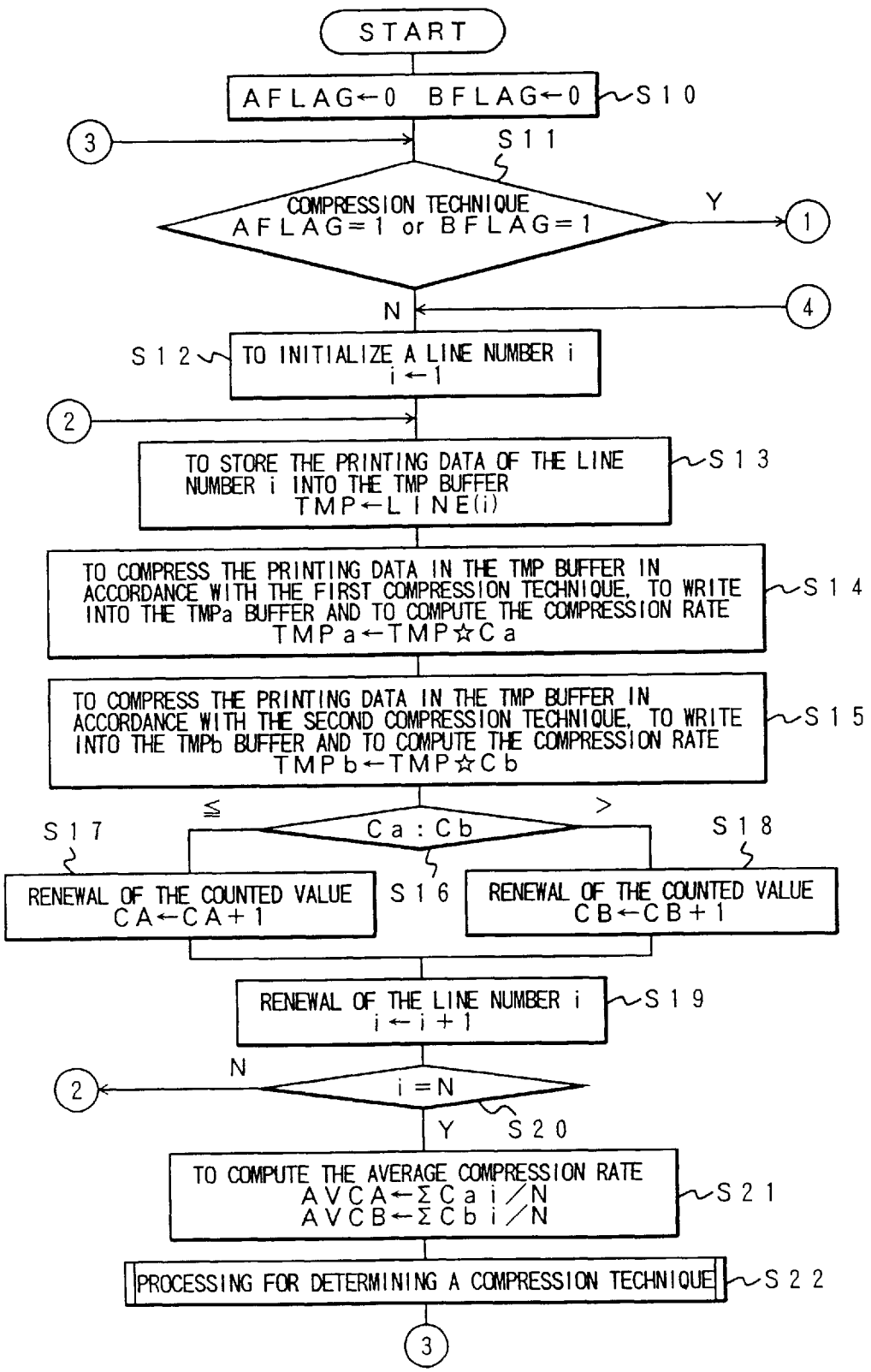
FIG. 3 is a flowchart illustrating a data compression method according to the preferred embodiment of the present invention.
Figure 4:
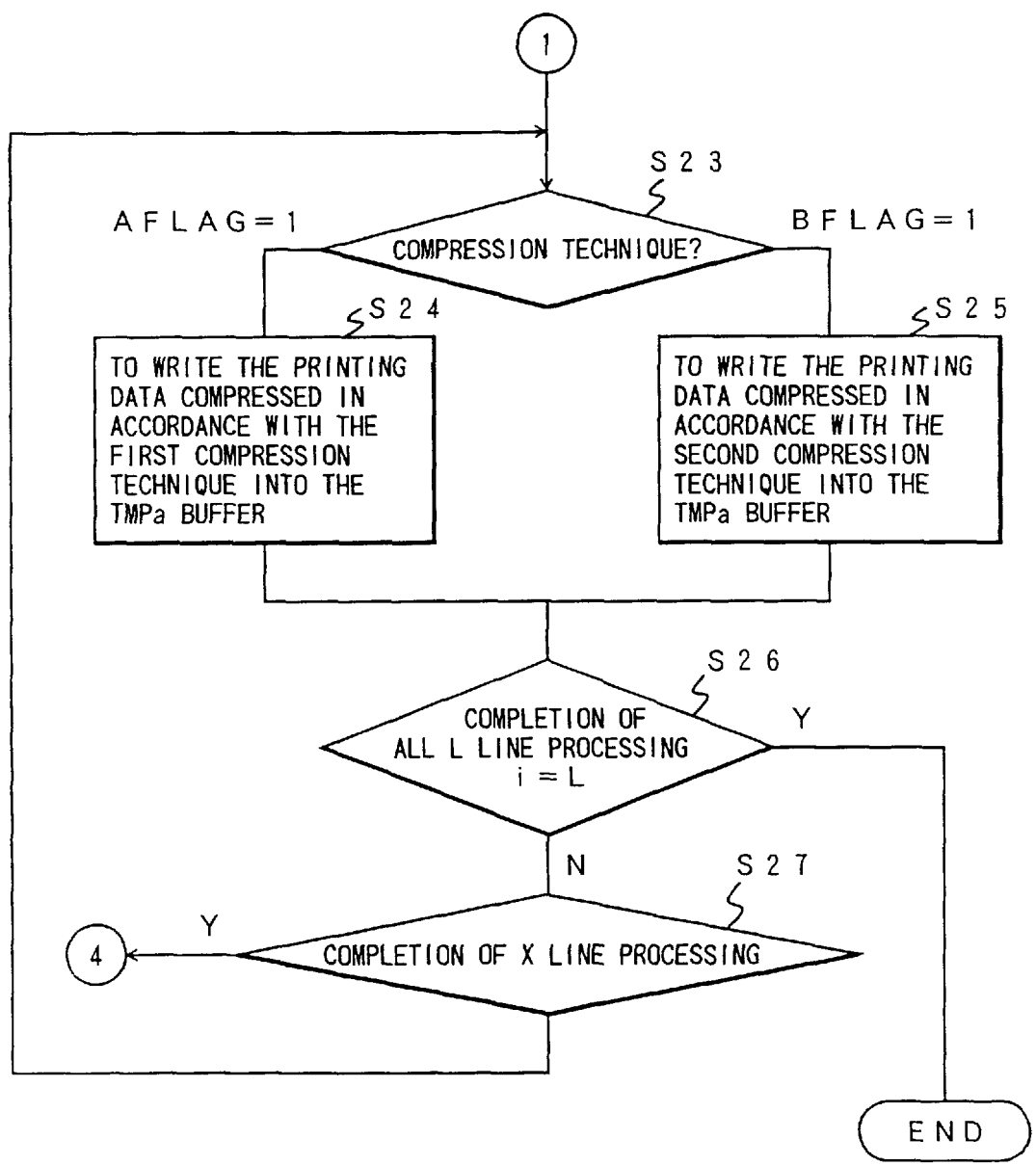
FIG. 4 is a flowchart illustrating a processing method after determination of the optimum compression technique in the data compression method shown in FIG. 3.

FIG. 3 is a flowchart illustrating processing steps of the data compression method described above. FIG. 4 is a flowchart illustrating processing steps after determination of the compression technique shown in FIG. 3, and FIG. 5 is a flowchart illustrating processing steps of a subroutine for determining a compression technique shown in FIG. 3. Hereinbelow, description is made as to the processing flow of the data compression method in reference to these drawings.

Step S10: A flag AFLAG indicating that the first compression technique is employed and a flag BFLAG indicating that the second compression technique is employed are respectively set to be "0".

Step S11: Judgement is made as to whether a predetermined compression technique exists. If the predetermined compression technique exists, proceed to a step S23 shown in FIG. 4, otherwise proceed to a step S12.

Step S12: To initialize a line number i to be "1".

Step S13: To write the printing data corresponding to the line number i into the TMP buffer 21 shown in FIG. 1.

Step S14: To compress the printing data in the TMP buffer 21 with the first compression technique, to write the compressed printing data into the TMPa buffer 22 and to compute the compression ratio Ca.

Step S15: To compress the printing data in the TMP buffer 21 with the second compression technique, to write the compressed printing data into the TMPb buffer 23, and to compute the compression ratio Cb.

Step S16: To compare the compression ratio Ca with the ratio Cb. If the compression rate Ca is not more than the rate Cb, proceed to a step S17. If the compression ratio Ca is more than the ratio Cb, proceed to step S18.

Step S17: To renew the counted number CA in the counter C1.

Step S18: To renew the counted number CB in the counter C2.

Step S19: To renew the line number i (to increment by one).

Step S20: To judge as to whether the printing data for the N lines are completed to process. If completed, proceed to a step S21, otherwise return to the step S13.

Step S21: To compute the average compression rates AVCA and AVCB.

Step S22: To perform the processing for determining a compression technique shown in FIG. 5 and return to the step S11.

Now, description will be made as to the processing steps after determination of the compression technique in reference to FIG. 4.

Step S23: To judge whether the employed compression technique is either the first compression technique or the second compression technique. If it is judged to be the first compression technique, proceed to a step S24. If it is judged to be the second compression technique, proceed to a step S25.

Step S24: To write the printing data compressed by the first compression technique into the TPMa buffer 22.

Step S25: To write the printing data compressed by the second compression technique into the TPMb buffer 23.

Step S26: To judge whether the processing was completed to all L lines in a page. If completed, proceed to the end of process, otherwise proceed to a step S27.

Step S27: To judge whether the processing was completed for the X lines. If completed, return to the step S12, otherwise return to the step S23.

Then, description will be made as to a subroutine of the processing for determining a compression technique shown in FIG. 5.

Step S22-1: To compare the counted number CA with the counted number CB and to compare the average compression rate AVCA with the average compression rate AVCB. If the counted number CA is not less than the counted number CB and the average compression rate AVCA is not more than the average compression rate AVCB, proceed to a step S22-2. If the counted number CA is less than the counted number CB and the average compression rate AVCA is more than the average compression rate AVCB, proceed to the step S22-3, and otherwise proceed to step S22-4.

Step S22-2: To transfer the printing data in the TMPa buffer 22 into the page buffer 17 by employing the first compression technique.

Step S22-3: To transfer the printing data in the TMPb buffer 23 into the page buffer 17 by employing the second compression technique.

Step S22-4: To judge the compression technique be undetermined.

Figure 7:
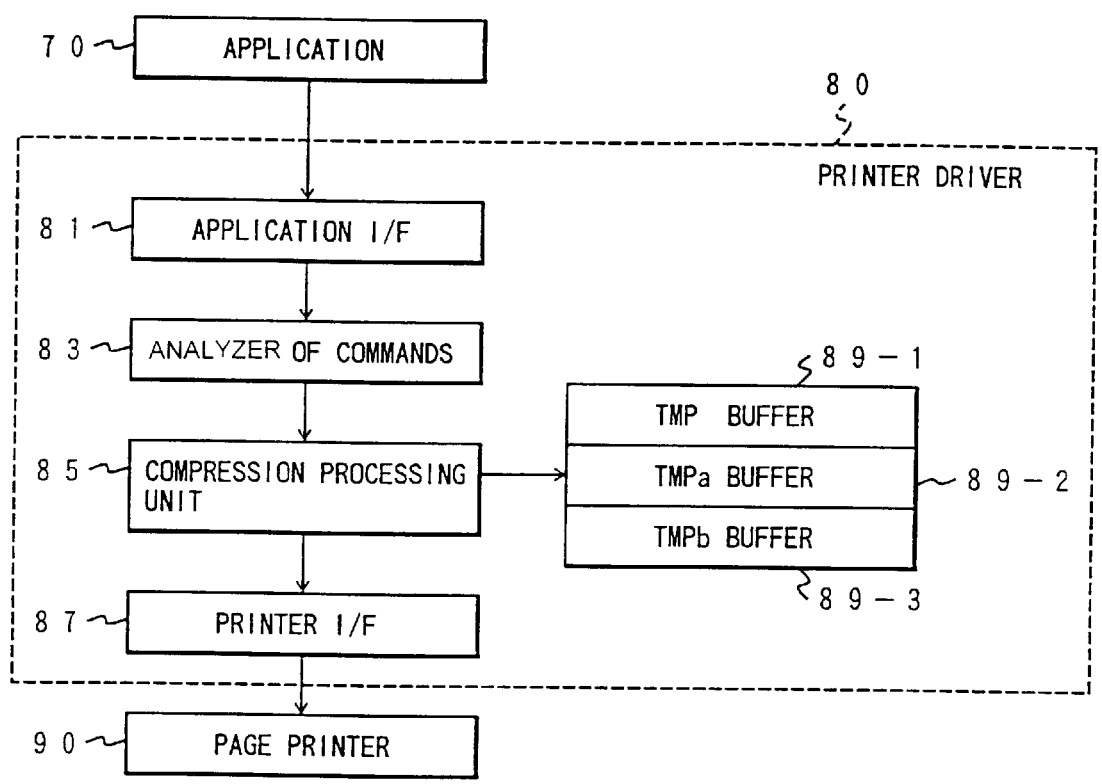
FIG. 7 is a block diagram illustrating a data compression method according to the preferred embodiment of the present invention, which is performed in a computer.

FIG. 7 shows another embodiment of the data compression method according to the present invention, in which a printer driver 80 selects the optimum compression technique, compresses the printing data, and transmits the compressed printing data to a page printer 90. In other words, this embodiment shows that the compression processing in the editorial task T3 in FIG. 2 is performed in a host computer. An application 70, for example, comprises word processor software, a page layout software, picture drawing software or the like. When the printer driver 80 receives the printing data, through an application interface I/F 81, from the application 70, a command analyzer 83 analyzes commands sent from the application 70.

Then, the optimum compression technique is determined by a compression processing unit 85, a TMP buffer 89-1, a TMPa buffer 89-2 and a TMPa buffer 89-3 in accordance with the processing flows shown in FIGS. 3 to 5, and compression is made as to the printing data, including the control data. The compressed printing data are transferred, through a printer interface 87, to the page printer 90. The page printer 90 expands the compressed data, deploys the printing data and provide them to a printing medium.

It has to be noted that the present invention is not limited to the aforementioned embodiments but can be modified in various manners within the spirit and scope of the present invention, For example, although the description of the embodiments was made as to the page printer to which the present invention is applied, the present invention is not restricted to be applied, in particular, to the page printer, and can be applied to a device which performs print processing for the data having a large amount of data capacity, such as picture image data or the like. Therefore, the present invention can even be applied to a facsimile device including therein a printer device, such as an ink jet printer or the like, which pertains to the categories other than those of the printer.

If the present invention were applied to a memory medium like a hard disc or MO (Magnetic Optical) disc, read/write operations of data can be effectively performed.

As described above in detail, the page printer according to the present invention incorporates the receiving buffer for storing the received printing data. The editor receives and compresses the printing data in the receiving buffer for every individual line in order to write into the page buffer.

Then, the expansion unit reads out the printing data in the page buffer and deploys it, as raster data, into the band buffer. Subsequently, the engine unit performs printing in accordance with the raster data in the band buffer.

The editor compresses the printing data of each line with plural types of compression techniques up until it reaches the present line N and computes the compression ratios for each line. The compression technique to be utilized is determined based on the compression ratios and the printing data for each line are processed to be compressed by the determined compression technique up to the preset line X. A determination of the compression technique is repeated in every processing completion of the printing data for the X lines.

Accordingly, since the printing data can always be compressed by employing the compression technique which reveals a smaller compression ratio, the efficiency for using printer memory can be enhanced.

Also, since the printing data up to the preset line X can be compressed by the same compression technique, time until when printing occurs can be shortened. The data compression method according to the present invention first compresses the printing data of each line up to the preset line N with plural kinds of compression techniques. Then, the compression ratios for each line are computed and the compression technique is determined in accordance with these compression ratios. Subsequently, the printing data of each line up to the preset line X are compressed by the determined compression technique.

Then, the determination of the compression technique is repeated in every processing completion of the printing data for the X lines. Accordingly, a compression technique having a smaller compression ratio is employed in every processing completion of the printing data for the X lines.

In this case, since the printing data can always be compressed by employing the compression technique having the smaller compression ratio, the efficiency for using print memory can be enhanced. Further, since the printing data for the preset X lines can be compressed by the same compression technique, time until when the printing occurs can be shortened.

Furthermore, since the printing data for the X lines can be expanded by the same expansion technique, time until when the printing occurs can be shortened.

What is claimed is:

1. A data compression method, comprising the steps of:
   (a) repeatedly and preliminarily compressing a first preset amount of first data, using each of plural different compression techniques and storing the compressed first data corresponding to each said different compression technique;
   (b) computing compression ratios corresponding to the respective compression techniques and storing the compression ratios;
   (c) comparing all the stored compression ratios to each other to determine an optimum compression technique corresponding to the smallest of the stored compression ratios from among the plural different compression techniques, after the compression ratios have been computed and stored for all the compression techniques;
   (d) compressing a second amount of second data, which amount is larger than the first amount, using the optimum compression technique; and
   (e) repeating said steps (a) through (d) for succeeding data whenever the data compression of the second data is completed until data compression of all data to be compressed is completed.

2. The data compression method set forth in claim 1, wherein:
   the step of compressing first data comprises dividing the first data into plural lines and compressing data in each of the plural lines by each of the plural compression techniques; and
   the step of computing compression ratios comprises computing for each line compression ratios corresponding to the respective compression techniques.

3. The data compression method set forth in claim 2, wherein the step of determining an optimum compression technique comprises:
   computing for each of the plural compression techniques an average value, taken over the plural lines, of the compression ratios corresponding to said each compression technique; and
   determining the optimum compression technique from among the plural compression techniques in accordance with the average values.

4. The data compression method set forth in claim 1, wherein the first and second data form a volume of data, a plurality of volumes of data forming a page of data, and wherein said steps (a), (b), and (c) are applied to the plurality of volumes of data, said steps (a), (b), and (c) being repeated independently for each volume of data.

5. A data compression method, comprising the steps of:
(a) repeatedly and preliminarily compressing first line data of each line of a first preset number of plural lines, using for each line a plurality of different compression techniques, and storing the compressed line data corresponding to each said different compression technique;
(b) computing for each line compression ratios corresponding to the respective compression techniques and storing the compression ratios;
(c) comparing, for each line, all the compression ratios to each other to determine separately for each line which of the plural compression techniques corresponds to the smallest of the compression ratios, after the compression ratios have been computed and stored for all the compression techniques;
(d) after said step (c), counting for each compression technique a number of times the compression technique corresponds to the smallest of the compression ratios;
(e) determining an optimum compression technique from among the plural compression techniques in accordance with the counted numbers for the respective compression techniques, after the compression ratios have been computed and stored for all the compression techniques;
(f) compressing second line data of a second preset number of plural lines following the first preset number of plural lines, using the optimum compression technique, the second preset number being larger than the first preset number; and
(g) repeating said steps (a) through (f) for succeeding line data whenever the data compression of the second line data is completed until compression for all line data to be compressed is completed.

6. The data compression method set forth in claim 5, further comprising the step of computing, separately for each of the plurality of compression techniques, an average value, taken over the plural lines, of the compression ratios corresponding to said each compression technique, wherein the step of determining the optimum compression technique is performed in accordance with both the counted numbers and the average values.

7. The data compression method set forth in claim 6, wherein the plurality of compression techniques comprises at least a first compression technique and a second compression technique;
the first compression technique being determined as optimum when a first pair of conditions, $CA \geq CB$ and $AVCA \leq AVCB$, are satisfied;
the second compression technique being determined as optimum when a second pair of conditions, $CA < CB$ and $AVCA > AVCB$, are satisfied;
wherein CA is the counted number corresponding to the first data compression technique and AVCA Is the average value of the compression ratios corresponding to the first data compression technique;
wherein CB is the counted number corresponding to the second data compression technique and AVCB Is the average value of the compression ratios corresponding to the second data compression technique; and
wherein the method further includes compressing all the data of each line using the optimum compression technique.

8. The data compression method set forth in claim 7, wherein a process for determining an optimum compression technique is repeated when the first pair of conditions and the second pair of conditions both are not satisfied.

9. The data compression method set forth in claim 7, wherein the first compression technique is further determined as optimum when only $CA >> CB$ is satisfied and the second compression technique is further determined as optimum when only $CA << CB$ is satisfied.

10. The data compression method set forth in claim 5, wherein the second data comprises a plurality of lines of data beyond the first preset line up to a second preset line.

11. The data compression method set forth in claim 10, wherein the first and second data form a volume of data, a plurality of volumes of data forming a page of data, and wherein said steps (a), (b), and (c) are applied to the plurality of volumes of data, said steps (a), (b), and (c) being repeated independently for each volume of data.

12. A system that performs data compression, comprising:
(a) first compressing means for repeatedly and preliminarily compressing a preset first amount of first data, using plural different compression techniques;
(b) first storage means for storing the compressed first data corresponding to each said different compression technique;
(c) computing means, coupled to the first compressing means, for computing compression ratios corresponding to the respective compression techniques;
(d) second storage means for storing the compression ratios;
(e) comparing means, coupled to the computing means, for comparing all the stored compression ratios to each other to determine an optimum compression technique corresponding to the smallest of the stored compression ratios from among the plural compression techniques, after the compression ratios have been computed and stored for all the data compression techniques;
(f) second compressing means, coupled to the comparing means, for compressing a second amount of second data, which amount is larger than the first amount, using the optimum compression technique; and
(g) controlling means for controlling the first compressing means, the computing means, the comparing means, and the second compressing means for repeated determination and application of the optimum data compression technique whenever the data compression of the second data is completed until data compression of all data to be compressed is completed.

13. The system set forth in claim 12, further comprising:
receiving means, coupled to the first compressing means, for receiving printing data including the first data, the second data, and control data from an application program; and
processing means, coupled to the second compressing means, for processing the second data for subsequent printing according to the control data.

14. The system set forth in claim 12, wherein the first data is divided into plural lines and the first compressing means compresses data for each of said plural lines using the plural compression techniques and wherein the computing means computes the compression ratios corresponding to the respective compression techniques for each of said plural lines.

15. The system set forth in claim 14, further comprising compression table means, coupled to the computing means, for storing the compression ratios computed for each of the plural lines, wherein the computing means computes, separately for each of the respective compression techniques, average values, taken over the plural lines, of the stored compression ratios corresponding to said each compression technique, and wherein the comparing means determines an optimum compression technique from among the plural compression techniques in accordance with the respective average values.

16. The system set forth in claim 13, wherein the receiving means accepts page data that includes a plurality of volumes of data, each of the volumes of data including the first data and the second data, and wherein the controlling means controls the first compressing means to compress the first data, the computing means to compute the compression ratios, and the comparing means to determine the optimum compression technique, independently for each volume of data.

17. The system set forth in claim 12, further comprising:
first storing means for storing printing data, the printing data including single page data, the single page data including the first data and the second data;
parsing means, coupled to the first storing means and the first compressing means, for parsing the single page data from the printing data and for parsing the first data and the second data from the single page data;
second storing means for storing the second data after the second data is compressed by the second compressing means;
expanding means for reading the compressed second data from the second storing means and expanding the read compressed second data as raster data;
third storing means for storing the raster data; and
printing means for printing the raster data in the third storing means.

18. The system set forth in claim 17, wherein the first data is divided into plural lines, wherein the first compressing means compresses each of the plural lines with each of the plural compression techniques and wherein the computing means computes compression ratios corresponding to the respective compression techniques for each of the plural lines.

19. The system set forth in claim 18, further comprising compression table means, coupled to the computing means, for storing the compression ratios computed for each of the plural lines;
wherein the computing means compares the compression ratios for each of the plural lines up to a first preset line to determine the smallest compression ratio for each of the plural lines, and counts separately for each of the plural compression techniques a number of lines for which the compression ratio corresponding to said each compression technique is the smallest compression ratio;
wherein the computing means further computes separately for each compression technique an average value, taken over the plural lines, of the compression ratios corresponding to said each compression technique; and
wherein the comparing means determines the optimum compression technique in accordance with both the counted numbers and the average values.

20. The system set forth in claim 17, wherein the single page data includes a plurality of volumes of data, each of said volumes of data including the first and second data, and wherein the controlling means controls the first compressing means to compress the first data, the computing means to compute the compression ratios, and the comparing means to determine the optimum compression technique, independently for each volume of data.

21. A system that compresses lines of data, comprising:
(a) first compressing means for repeatedly and preliminarily compressing first data, including a first predetermined number of plural lines of data, the first compressing means repeatedly and tentatively compressing each line of the first predetermined number of plural lines, using plural different compression techniques;
(b) first storage means for storing the compressed first data corresponding to each said different compression technique;
(c) computing means for computing for each line compression ratios corresponding to the respective compression techniques;
(d) second storage means for storing the compression ratios;
(e) comparing means, coupled to the computing means, for comparing all the compression ratios for each line of said predetermined number of lines to determine the smallest compression ratio for each of the plural lines, after the compression ratios have been computed and stored for all the data compression techniques;
(f) counting means for counting, separately for each compression technique, a number of lines for which the smallest compression ratio corresponds to said each compression technique;
(g) determining means, coupled to the computing means, for determining an optimum compression technique from among the plural compression techniques in accordance with the counted numbers;
(h) second compressing means, coupled to the determining means, for compressing second line data of a second predetermined number of plural lines following the first predetermined number of plural lines, using the optimum compression technique, the second predetermined number being larger than the first predetermined number; and
(I) controlling means for controlling the first compressing means, the computing means, the determining means, and the second compressing means for repeated determination and application of the optimum data compression technique whenever the data compression of the second data is completed until data compression of all data to be compressed is completed.

22. The system set forth in claim 21, further comprising:
receiving means, coupled to the first compressing means, for receiving printing data including the first data, the second data, and control data from an application program; and
processing means, coupled to the second compressing means, for processing the second data for subsequent printing according to the control data.

23. The system set forth in claim 22, further comprising compression table means, coupled to the computing means, for storing the compression ratios computed for each line;
wherein the computing means computes, separately for each compression technique, an average value, taken over the plural lines, of the compression ratios corresponding to said each compression technique; and
wherein the determining means determines the optimum compression technique from among the plural compression techniques in accordance with both the counted numbers and the average values.

24. The system set forth in claim 22, further comprising controlling means for controlling the first compressing means, the computing means, the comparing mean, the determining means, and the second compressing means for repeated determination and application of the optimum data compression technique.

25. The system set forth in claim 23, wherein the receiving means receives page data that includes a plurality of volumes of data including the first data and the second data, and wherein the controlling means controls the first compressing means to compress the first data, the computing means to compute the compression ratios, and the determining means to determine the optimum compression technique, independently for each volume of data.

26. The system set forth in claim 21, further comprising:
first storing means for storing printing data, the printing data including single page data, the single page data including the first data and the second data;
parsing means, coupled to the first storing means and the first compressing means, for parsing the single page data from the printing data and for parsing the first data and the second data from the single page data;
second storing means for storing the second data after the second data is compressed by the second compressing means;
expanding means for reading the compressed second data from the second storing means and expanding the read compressed second data as raster data;
third storing means, coupled to the expanding means, for storing the raster data; and
printing means, coupled to the third storing means, for printing the raster data stored in the third storing means.

27. The system set forth in claim 26, further comprising compression table means, coupled to the computing means, for storing the compression ratios computed for each of the plural lines;
wherein the computing means computes, separately for each compression technique, an average value, taken over the plural lines, of the compression ratios corresponding to said each compression technique; and
wherein the determining means determines the optimum compression technique in accordance with both the counted numbers and the average values.

28. The system set forth in claim 27, wherein the plural compression techniques comprise at least a first compression technique and a second compression technique;
the first compression technique being determined as optimum when a first pair of conditions, $CA \geq CB$ and $AVCA \leq AVCB$, are satisfied;
the second compression technique being determined as optimum when a second pair of conditions, $CA < CB$ and $AVCA > AVCB$, are satisfied;
wherein CA is the counted number corresponding to the first data compression technique and AVCA is the average value of the compression ratios corresponding to the first data compression technique;
wherein CB is the counted number corresponding to the second data compression technique and AVCB is the average value of the compression ratios corresponding to the second data compression technique; and
wherein the second compression means employs the optimum compression technique to compress all the data of each line.

29. The system set forth in claim 28, wherein the determining means repeats a process for determining an optimum compression technique when both the first pair of conditions and the second pair of conditions are not satisfied.

30. The system set forth in claim 28, wherein the determining means determines the first compression technique as optimum when only $CA \gg CB$ is satisfied and the determination means determines the second compression technique as optimum when only $CA \ll CB$ is satisfied.

31. The system set forth in claim 26, further comprising controlling means for controlling the first compressing means, the computing means, the comparing mean, the determining means, and the second compressing means for repeated determination and application of the optimum data compression technique.

32. The system set forth in claim 31, further comprising: receiving means which receives page data that includes a plurality of volumes of data including the first data and the second data, and wherein the controlling means controls the first compressing means to compress the first data, the computing means to compute the compression ratios, and the determining means to determine the optimum compression technique, independently for each volume of data.

* * * * *